United States Patent [19]

Eninger

[11] Patent Number: 5,319,376
[45] Date of Patent: Jun. 7, 1994

[54] ARCTIC SUBMARINE BUOY AND APPLICATION METHODS

[75] Inventor: James E. Eninger, Torrance, Calif.
[73] Assignee: TRW Inc., Redondo Beach, Calif.
[21] Appl. No.: 983,918
[22] Filed: Dec. 1, 1992
[51] Int. Cl.$^5$ .......................... H04B 7/185; G01S 5/02
[52] U.S. Cl. ........................................ 342/357; 367/4; 441/3
[58] Field of Search .................. 342/357, 385, 386; 367/4; 441/11, 30, 33; 114/328; 102/411

[56] References Cited

U.S. PATENT DOCUMENTS

| | | | |
|---|---|---|---|
| 4,630,289 | 12/1986 | Wren | 441/11 |
| 4,651,834 | 3/1987 | Eninger et al. | 175/18 |
| 4,794,575 | 12/1988 | Miller | 367/134 |
| 4,962,488 | 10/1990 | Dell-Imagine et al. | 367/3 |
| 5,014,248 | 5/1991 | Feltz et al. | 367/4 |
| 5,116,268 | 5/1992 | Eninger et al. | 441/3 |
| 5,119,341 | 6/1992 | Youngberg | 367/5 |

Primary Examiner—Theodore M. Blum
Attorney, Agent, or Firm—Ronald M. Goldman; Sol L. Goldstein

[57] ABSTRACT

An improved ice penetrating arctic buoy for release from a submarine submerged under a layer of ice includes a Global Positioning System navigational processor receiver and/or a Emergency Position Information Radio Beacon and/or surveillance apparatus, an antenna for transmission and/or reception of appropriate RF frequencies, such as Global Positioning System or other R.F. frequencies found in the environment above the ice or EPIRB R.F. frequencies originating in the buoy into the environment above the ice. Convertor means converts navigational information and/or other information outputted from said Global Positioning System receiver into coded corresponding information and an on board transmitter sends such coded information acoustically or optically and/or electrically to the submarine via an underwater data link.

9 Claims, 3 Drawing Sheets

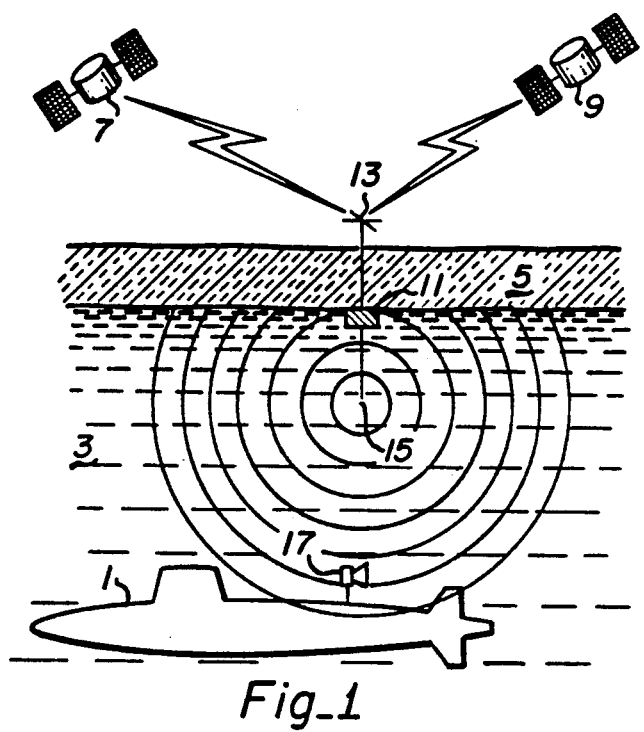
Fig_1
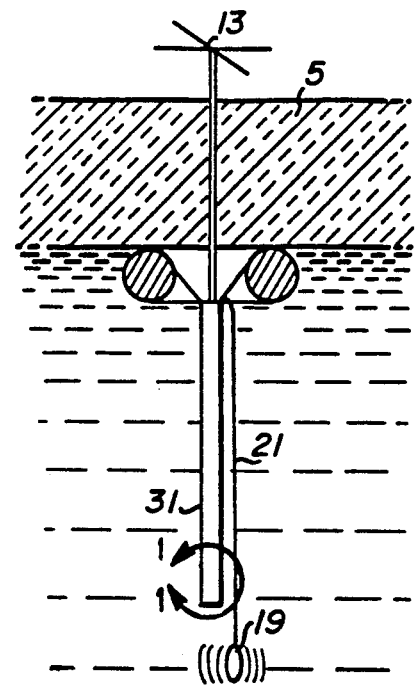
Fig_2
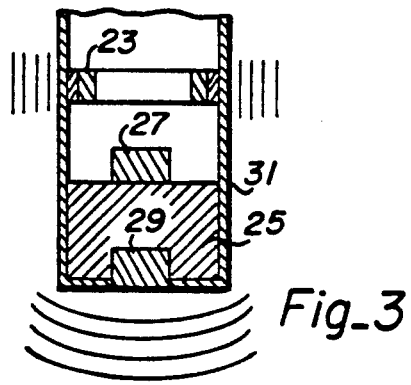
Fig_3
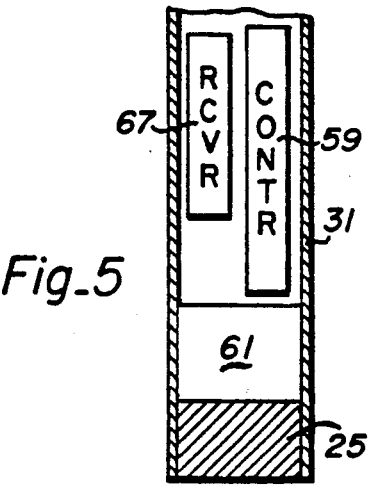
Fig_5
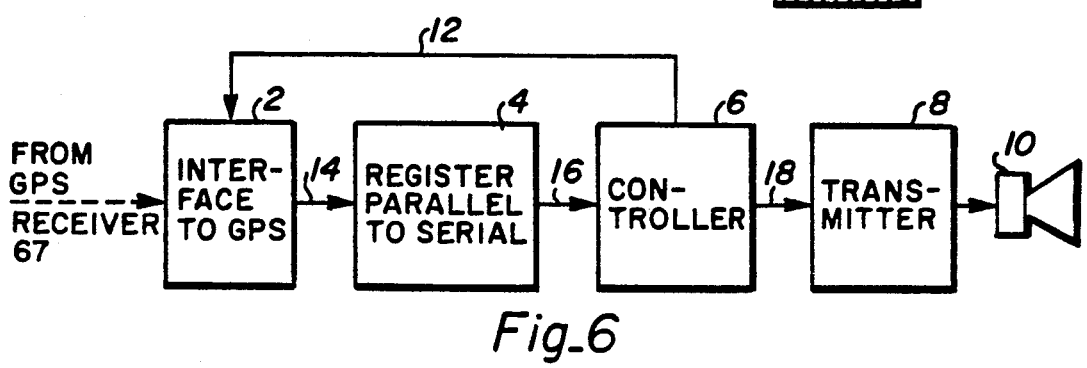
Fig_6

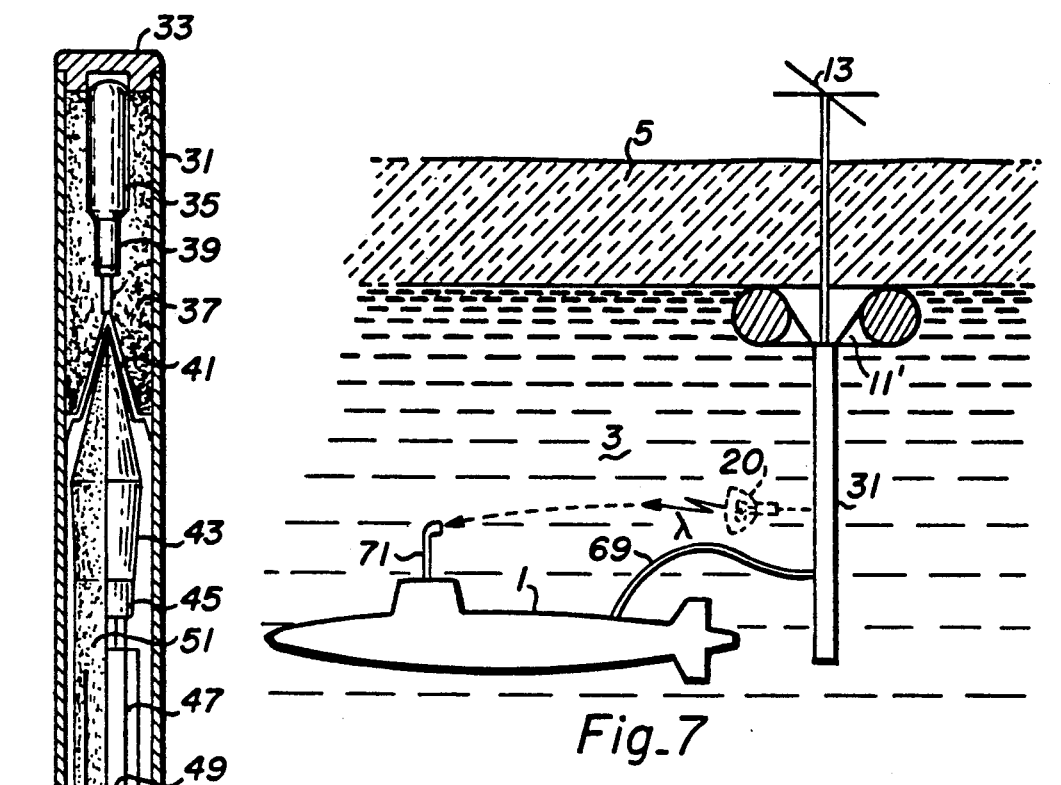
Fig_7
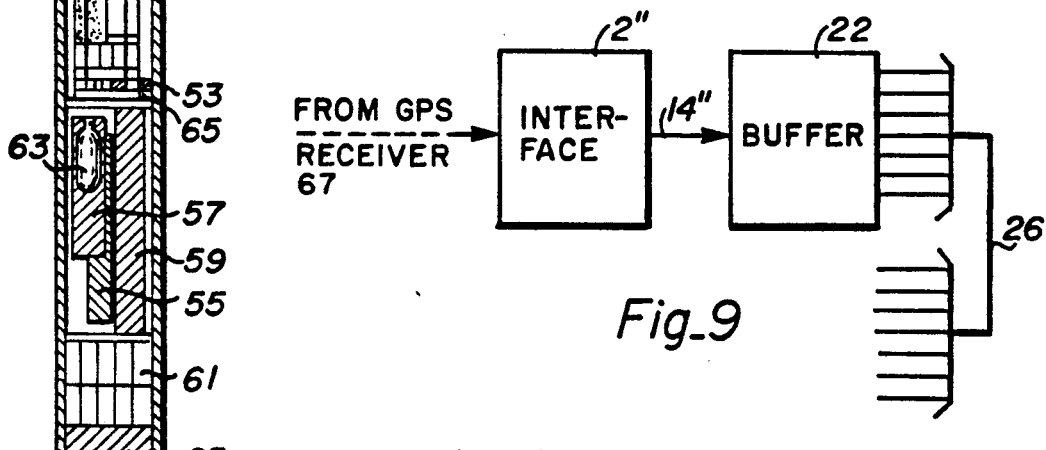
Fig_9
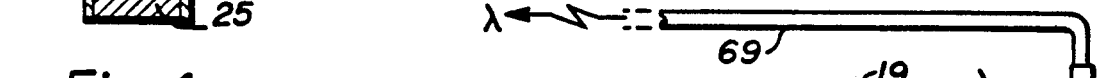
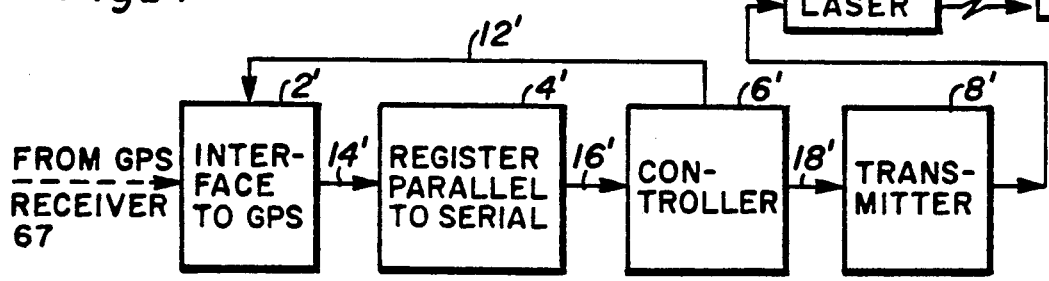
Fig_8
Fig_4

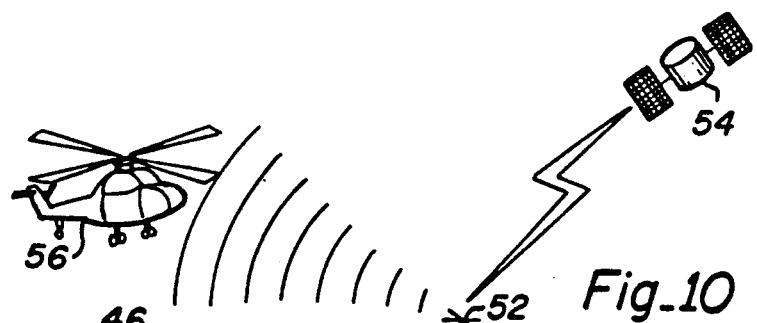
Fig._10
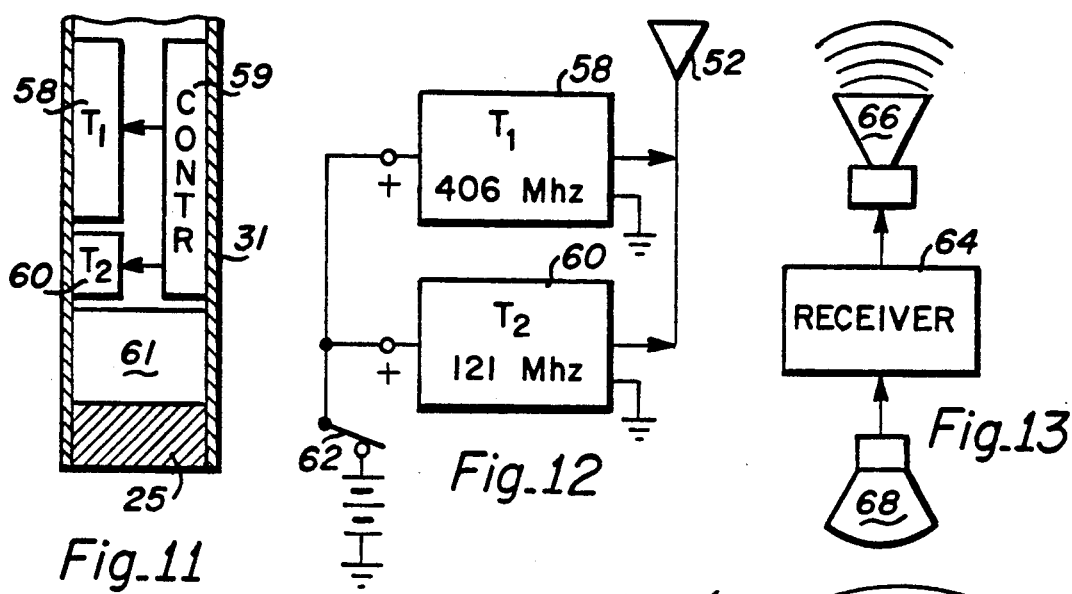
Fig._11  Fig._12  Fig._13
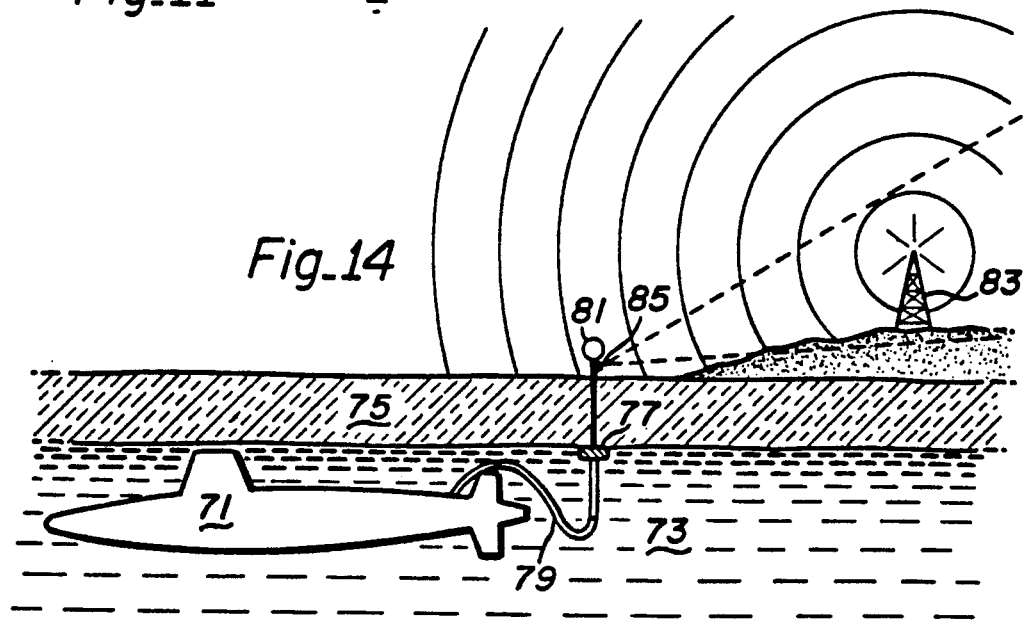
Fig._14

ARCTIC SUBMARINE BUOY AND APPLICATION METHODS

FIELD OF THE INVENTION

The present invention relates to a method of permitting a person located on board a submarine that is submerged under the Arctic ice pack to secure navigational information, invite rescue, and/or engage in surveillance without requiring the submarine to surface and be exposed above the ice. The invention also relates to improved Arctic buoys of the thermochemical ice penetrating type useful to practice the described method.

BACKGROUND

Arctic submarine communication buoys are known devices designed for use by submarines that are to be deployed in the ice capped Arctic regions. In operation such type of buoy is released from the submarine, is buoyed up against the ice cover, bores a passage through the overlying ice to reach the top side, and thereupon releases various equipment carried in the buoy, the payload, above the ice, such as a radio antenna, that permits the submarine to carry on point-to-point radio communications with communication satellites.

Many techniques are known to penetrate the ice pack and form a passage. One kind is the thermochemical type ice penetrator, which is carried by the buoy. In that type ice penetrator, the thermochemical material undergoes an exothermic reaction with the ice and causes the ice to melt. One reactant of such reaction is water, which is at least partially supplied by the ice as it melts. The second reactant, typically, is an alkali metal or an alloy containing an alkali metal, preferably lithium. Those are known devices.

Although thermochemical type penetrators are relevant in a general sense as a component element to the improved buoys presented herein and as background, the details thereof are not necessary to the understanding of the present invention. An excellent source of more detailed background structure to and applications for buoys incorporating such penetrators is found in the patent to Eninger et al., U.S. Pat. No. 4,651,834, granted Mar. 24, 1987, which is assigned to TRW Inc., the assignee of the present application. The entire specification of the Eninger et al patent, for convenience, is incorporated herein by reference.

Modern naval vessels, including submarines, have for some time past been equipped with electronic navigation systems as enables the craft's commander to determine the global position of the craft relative to the global position from the point of departure. Moreover, the recently introduced global positioning system makes use of multiple orbiting satellites to allow one to determine ones global position, latitude, longitude and height as example, with predetermined accuracy using RF signals broadcast from the satellites. With the availability of the foregoing kind of positioning system, the craft's global position may be checked from time to time and the on-board navigation system adjusted, updated, as necessary.

In the open ocean, a submarine is able to erect an antenna with or without surfacing. When the submarine is located under the extensive ice pack of the North or South polar regions, it is often not possible to surface to expose the antenna and the antenna erecting mechanism used in the open ocean appears ineffective in that environment. Inevitably, prior to the present invention, errors as might occur in the electronic navigation system aboard such submarines would accrue during the submarines extended submerged travel under the ice pack. However small those errors may seem in the absolute or commercial sense, cumulatively the errors become unacceptably large to submariners in dark underwater surroundings. The navigational errors could lead to a collision with a charted obstacle and imperil the submarine's crew. The arctic buoys of the present invention allow the navigation systems to avoid that difficulty.

While losses of submarine and crew through equipment failure have been rare, apart from loss in battle during time of war, such losses are not unheard of. The men who share the submarine's berth should have the comfort of knowing that they could be rescued should the submarine fail while submerged. With modern submarine technology permitting extended travel under polar ice, the submariner's normally high morale could be adversely affected in the contemplation of greater personal danger of under ice travel: Should the submarine fail under the ice pack and be unable to surface no one will be able to determine the submarine's whereabouts and mount rescue. The polar ice pack that serves as a perfect hiding place for the submarine could thus also serve as an inescapable trap. The improved buoys of the present invention eliminate those anxieties. In the event of an under-the-ice predicament in which the submarine is disabled, the submariners need no longer be considered unfortunates lost through limitations of technology who must sacrifice their lives.

The technology that cures the foregoing problems offers opportunity for application to ancillary applications, such as surveillance of above-the-ice conditions; an added advantage. While submerged under the ice pack conditions in the environment above the ice pack may be observed.

Accordingly, an object of the present invention is to provide a new method for updating navigational information on board a submerged submarine without requiring the submarine to surface through the ice and to provide a new buoy design for carrying out such method;

A related object is to provide a novel process to permit disabled submarines trapped below the ice to notify others of its position and invite rescue, as well as to guide potential rescuers to its position and to provide a new and inexpensive buoy design for practicing that method; and A still further object of the invention is to provide a novel apparatus and method to perform above ice surveillance from aboard a submerged submarine.

SUMMARY

In accordance with the foregoing objects, an improved ice penetrating arctic buoy that is released from a submerged submarine, includes a Global Positioning System navigational processor receiver and/or a Global Position Information System transmitter and beacon transmitter and/or surveillance apparatus, an antenna for transmission and/or reception of appropriate frequencies, such as Global Positioning System R.F. frequencies, means for converting navigational information and/or other information outputted from said receiver to coded corresponding information and an on board transmitter for sending such coded information back to the submarine.

An ice penetrating arctic buoy that is released from a submerged submarine includes a Global Positioning System navigational processor receiver, an antenna for reception of Global Positioning System frequencies, means for converting navigational information outputted from said receiver to coded corresponding navigational information and an on board transmitter for sending such coded information to the submarine.

In one embodiment the transmitter is of the ultrasonic type and broadcasts such information through the water as acoustic ultrasonic signals, whence those signals are detected and deciphered on board the submarine. In an alternative embodiment the buoy's transmitter is a light transmitting optical transmitter, wherein the navigational information is sent through the water as bursts of light, which are received on board the submarine, as example, via the submarines periscope. In still another embodiment the optical transmitter is used and the buoy is tethered to the submarine by an optical fiber. The optical transmitter is coupled to the fiber optic cable and a receiving apparatus on the submarine detects such light transmission from the other end of the optic cable. In a further embodiment the bouy is tethered to the submarine by an electrical transmission line and the buoys transmitter sends the information in the form of electrical pulses.

The foregoing and additional objects and advantages of the invention together with the steps and structure characteristic thereof, which was only briefly summarized in the foregoing passages, becomes more apparent to those skilled in the art upon reading the detailed description of the preferred embodiments of the invention and method, which follows in this specification, taken together with the illustration thereof presented in the accompanying drawings.

DESCRIPTION OF THE DRAWINGS

In the Drawings:

FIG. 1 is a pictorial illustration of an embodiment of the invention as deployed to receive and relay Global Positioning System satellite source navigational information;

FIG. 2 pictorially illustrates in larger scale a specific embodiment of the buoy and a transducing element used in the embodiment of FIG. 1;

FIG. 3 is an enlarged partial section view of a portion of the buoy of FIG. 2 taken along section 1—1 illustrating several alternative ultrasonic transducer structures that are useful in the embodiment of FIG. 1;

FIG. 4 is a section view of a buoy pictorially illustrating internal components found in previous Arctic submarine buoys which is incorporated in great part in the present invention;

FIG. 5 is a pictorial partial section view of a buoy constructed according to the invention of FIG. 1;

FIG. 6 is a block diagram of the convertor and transmitter portions of the buoy's electronic apparatus used in FIG. 1 to communicate with the submarine;

FIG. 7 pictorially illustrates an additional embodiment of the invention containing still additional alternative structures for to afford communication between the buoy and the submarine;

FIG. 8 is a block diagram of the convertor and transmitter portions of the buoy's electronic apparatus used in the embodiment of FIG. 7 to communicate with the submarine;

FIG. 9 is a block diagram of another alternative interface apparatus for coupling the output of the Global Positioning System receiver in the buoy to receiving apparatus in the submarine;

FIG. 10 pictorially illustrates an embodiment of the invention that permits submerged craft to signal rescuers and invite rescue;

FIG. 11 is a pictorial partial section view of a buoy constructed according to the invention of FIG. 10;

FIG. 12 is a block diagram of the transmitting section of the buoy used in the embodiment of FIG. 10;

FIG. 13 shows a block diagram of the submarine on board receiving apparatus used in the embodiment of FIG. 1 to decode incoming information; and FIG. 14 is a pictorial illustration of an embodiment of the invention that accomplishes above-the-ice surveillance.

DETAILED DESCRIPTION OF THE PREFERRED EMBODIMENTS

When Global Positioning System position information is desired, as example, the appropriate buoy is selected and launched from the submarine into the sea water. Being buoyant in water, the buoy rises through the water to the overlying ice layer. It then melts a passage through the ice, allowing the antenna being carried to be extended from the buoy housing above the ice to better receive global positioning information that is being broadcast by the Global Positioning Satellites, while the buoy housing remains under the ice layer.

Reference is made to FIG. 1 in which a fully deployed system is pictorially illustrated with submarine 1 submerged in sea water 3 under ice layer 5. Global positioning system satellites, 7 and 9, only two of which are illustrated, are shown moving in orbit in outer space, and are broadcasting the conventional timing pulses and sender position information at RF frequencies. Such broadcast RF signals are picked up at buoy 11 by antenna 13, preferably a patch type antenna, located above the ice.

The received RF signal is propagated from antenna 13 through the ice via the antenna lead to the buoy's main housing, the latter of which contains the electronic apparatus in which such signals are processed electronically; the Global Positioning System receiver, hereafter referred to by the acronym "GPS" receiver. The GPS receiver, not illustrated in the figure, converts those received signals to present position information, latitude, longitude and height. In conventional GPS receivers of that type such position information is stored in memory circuits and, with suitable interface circuitry, is used to drive an associated display associated with the electronics in a physically self-contained unit. The display presents in alpha numeric form, visible to the user, the buoy's latitude and longitude and height. In this embodiment that latitude and longitude information is instead, as hereafter discussed in greater detail, converted into a code, such as International Morse Code, since there is no need to provide a visible display within the buoy housing. Those Morse code signals are supplied to a transmitter which drives ultrasonic transducer 15, creating the bursts of above audible sound, represented by the circular lines in the water broadcast for reception by the submarine's ultrasonic pick up, symbolically represented as 17.

Global positioning receivers are known electronic navigation devices that are being marketed commercially at present, having been introduced in the last two to three years in the commercial marketplace following some years in military application. As example one such handheld global positioning receiver is that being marketed under the Pyxis brand name, advertised as being accurate to fifty feet, weighing twenty one ounces and operating on four double A batteries, available from the Tiger Software Company.

Global Positioning System Satellites are maintained by the U.S. Government and serves as an effective international standard of global position information. There are over twenty such satellites orbiting at altitudes of 12,625 miles, and, of those, four such satellites are available from any point on the surface of the earth twenty four hours a day. Each satellite has its unique coded identification signal and highly accurate atomic clock. Moreover earth stations constantly monitor all satellites sending back information on their relative position and correct for any atmospheric conditions that may affect signal accuracy. The degree of accuracy in this system is selected by the operator, the U.S. Government, and can be varied by the operator at will.

As shown in the figure, the ultrasonic Morse code signals are broadcast by buoy 11 through the water. The water serves as an effective transmission medium or acoustic data link, as alternatively termed, whereby the Morse Code signals are received at the submarine. In its simplest form, the submarines sonar receivers and/or other underwater listening devices, conventionally found on submarines detects those coded ultrasonic signals and converts them to audio frequencies in the range of human hearing, audible sounds, which the submarine operator may listen to directly and decode. The submarine operator may then enter the appropriate navigation information as decoded into the submarine's electronic navigation system as needed.

In as much as the ultrasonic sound transmitters aboard submarine buoy 11 are low power, the acoustic signals generated do not propagate to any great distance, say one hundred meters. Hence those signals should not be detected by any other vessels that may be nearby and the submarine's presence remains undetected.

For this embodiment the ultrasonic transducers have several practical embodiments, which are presented in FIGS. 2 and 3 to which reference is made. Turning first to FIG. 2, the preferred structure for the ultrasonic transducer is an external acoustic transducer 19 that is tethered by a length of water impervious electrical cord 21 that conducts the electrical signals from the circuits in the buoy housing externally to the transducer for conversion into acoustic energy. Such embodiment allows use of presently available underwater ultrasonic transducers, avoiding the need for specialized designs and possible delays in manufacturing such specialized components, which translates into a lesser cost than the other examples hereafter presented.

Considering next the several additional alternative ultrasonic transducer structures presented in FIG. 3, as shown, the transducer may be formed of piezoelectric material annular in shape with the outer annular surface placed in contact with the buoy's cylindrical metal wall surface 31, such as transducer 23, illustrated in section. In this embodiment acoustic energy is propagated by radial transmission through the buoy tube's wall.

In another embodiment the acoustic transducer may be disc or puck shaped, a short height cylinder resembling a hockey puck, and be fastened atop the buoy tube's base plug 25, such as the transducer 27. With this embodiment, acoustic energy is transmitted axially though the base plug into the surrounding water. In still another embodiment base plug 25 may contain a cylindrical closed cavity at its bottom and the puck shaped acoustic transducer may be seated within that bottom cavity directly exposed to the seawater, such as transducer 29. In this practical embodiment the acoustic energy is transmitted directly into the seawater. As those skilled in the art will appreciate other acceptable forms of ultrasonic transducers may be substituted in the described combination. For clarity of illustration, the electrical leads which supply electrical current to the piezoelectric transducers are not illustrated.

Reference is made to FIG. 4 which is a section view illustrating the major components of an Arctic submarine communications buoy. The buoy's housing 31 is a cylindrical aluminum tube having thin cylindrical walls and a top cap 33 closing the top end of the tube, the cap being held in place by shearable nylon screws, not illustrated. A disk shaped bottom end or cover 25 is sealed in place with an "O-ring" seal and attached with screws, closing the tube's bottom end. Bottle 35, containing a gas under pressure, suitably carbon dioxide, and a surrounding inflation bladder 37, are included at the upper end within the tube. The inflation bladder is of a torus shape and in operation effectively functions like the familiar tire inner tube. The inflation bladder is connected to gas bottle 35 via a squib actuated opener 39, so as to permit the bladder to be filed with gas to increase buoyancy of the apparatus when the bladder is released into the water as hereafter briefly described.

The thermochemical ice penetrator 43 typically is pointed in shape, resembling a projectile, and its front end mates with a conical cavity in expulsion piston 41. The penetrator overlies extension control 45, foldable antenna 47 and extendable mast 49. A plastic film sheath 51 protectively wraps and ensheathes the last three identified elements.

The transmitter section of the buoy includes a frequency synthesizer 55, power amplifier 57 and digital controller 59. Underlying those electronic units is rechargeable battery pack 61, suitably of the nickel-cadmium type.

Scuttle cutter 53 is a cutting blade. When actuated, the cutter cuts the connection between the section containing the electronics and the extendable mast and causes the electronic section, which is not buoyant, to sink. That minimizes the possibility that unauthorized persons, a military adversary as example, might gain access to and inspect that electronic apparatus. The cutter is squib driven. Digital controller 59 includes a coded signal that is issued when the buoy's tasks are completed. That electrical signal actuates the squib and causes it to explode. In turn the explosive force actuates the cutter and the cutter servers the connecting post and electrical wires.

A second pressurized gas filled bottle 63, also suitably filled with carbon dioxide gas, is located in the housing beneath scutter cutter 53 with the confined gas being a stored motive force. When released from bottle 63, the expanding gas forces expulsion piston 41 to expel end cap 33 and the floatation subsystem.

The closed buoy is bouyant. After the buoy is expelled from the submarine through the submarine's signal launcher tube, the buoy rises in the water under the buoyant force and abuts against the overlying ice layer. Gas bottle 63 is opened and creates a high pressure within the housing tube 31 that causes end cap 33 to pop off, by shearing the small nylon screws, not illustrated, that hold the cap in place. The gas pressure also forces explusion piston 41 to push gas bottle 35 and inflation bladder 37 out of the buoy tube and into the water. Inflation bladder 37 is then pressurized with gas released from gas bottle 35 and inflates to create a buoyant mass surrounding the front end of the tube.

Thermochemical ice penetrator 43 is released against the ice to start melting a passage. The spring steel extendable mast 49 pushes the penetrator against the ice as penetration continues. After the penetrator bores through the ice, antenna mast 49 is extended and the antenna 47 is unfolded. At the appropriate moment a clutch stops a spool from feeding out a tether, the mast stops extending and the penetrator flies off. Typically the atenna extends about two feet above the ice.

The foregoing is essentially a one shot system. The buoy may be disposed of after use by scuttling or, if the scuttle cutter is eliminated from the design, be left to remain and sink when the ice eventually melts.

As those skilled in the art are familiar with Arctic Submarine buoy structure, such structure need not be illustrated or described in greater detail. The summary description, however, serves as appropriate foundation for the modifications presented herein as improvement.

The physical configuration of the buoy and internal components that was earlier presented in the version of FIG. 4, representative of versions in current use is ideally also used for the physical configuration of the navigational buoy and other improved buoy embodiments presented in this specification. That commonality serves to reduce cost of the new buoy and avoid delays as would otherwise be necessitated by hardware redesign. Accordingly, the electronics in the lowermost section of the cross sectional view in FIG. 4 is modified to substitute the GPS receiver and appropriate controllers. That portion of the navigational buoy is illustrated in partial section view in FIG. 5 to which reference may be made. As shown the GPS receiver 67 is mounted in tubular housing 31 adjacent the controller 59. The other elements are conveniently packed in that same location.

GPS receiver 67 is available in the marketplace as essentially an off-the-shelf item. It is available minus the protective housing on a single electrical circuit board with the conventional visual display removed. Appropriate connections are made to the circuit board to interface the output of the GPS receiver to the acoustic transmitters. This is presented in FIG. 6.

The block diagram of FIG. 6 illustrates the electronic circuits that convert the output of the GPS receiver to the acoustic signal earlier described. This includes an interface circuit 2, which may contain suitable electronic buffers, having an input connected to the appropriate output circuits of GPS receiver 67, indicated in dash lines; a register 4 to receive via data path 14 and hold the input information supplied by interface 2, a controller 6 and a transmitter 8, having its output coupled to ultrasonic transducer 10. Interface 2 has its inputs connected to either of the numeric or binary registers of the GPS receiver in any conventional manner so as to obtain the appropriate latitude and longitude data, as received in the GPS receiver, in electronic form.

Controller 6 via control lead 12 enables the buffer to temporarily complete the connection and output the data via output 14 to register 4's inputs, wherein the data may be temporarily stored. The controller receives that information from register 4, as represented by output 16, and couples that information for the predetermined interval via an output 18 to the input of the transmitter 8. This data is supplied in an electronic code. As example, if the input to the register is in parallel, the controller includes conventional translating circuits by means of which the parallel data is converted into a serial code. When the desired code is the International Morse Code, then that information is converted into the appropriate dots and dashes, represented as short and long electrical signals, that are serially transmitted. As example the information may include a preliminary code that indicates that longitude and latitude information is to follow.

As example, if the output register supplies, among other numbers, the number 3, when the controller determines the appropriate time for sending that number, the controller sends a series of three dots followed by two dashes. That information is supplied via lead 18 to the transmitter, specifically an ultrasonic transmitter which modulates its output signal according to signal applied at its input, and provides an output signal that is of a frequency in the range of acoustic signals in the ultrasonic region, above the range of human hearing. Transducer 10, suitably a conventional hydrophone, converts the electronic signals that are inputted into high frequency sound and couples that sound to the ambient seawater.

Those persons skilled in the art appreciate that the details of such circuitry may be varied as desired and are not relevant to an understanding of the invention.

In the foregoing embodiment the system employed an acoustic data link between the buoy and the submarine. As pictorially illustrated in FIG. 7, other alternatives for the data link are possible. As example, the submarine may be coupled to the buoy by an optical cable, consisting of one or more fiber optic lines, 69. An appropriate light transmitting source or optical transmitter is included in buoy 11' to send the light into one end of cable 69 and an appropriate light or optical receiver is included within submarine 1' to receive and decode that signal.

Suitably the optical cable is coiled in the bottom section of the buoy and is unreeled or uncoiled as the buoy is buoyed upward while an end of the cable is held at the submarine. Other alternatives for packing and unreeling that cord are possible as recognized by those skilled in the art. Not only does optical cable 69 serve as an optical data link but the cable tethers the buoy to the submarine.

The block diagram in FIG. 8, to which reference is made, presents the circuitry to couple GPS receiver 67 to such an optical data link. This circuitry includes the appropriate electronic elements for converting the GPS receiver's information on longitude and latitude into the coded flashes outputted by laser 18, the output of which is represented by the Greek symbol lambda. As is recognized the block diagram includes the appropriate interface, the register, the controller, and the transmitter and appropriate input/output and control lines, which are essentially the same elements that were presented in FIG. 6 and operate together in the same manner as the circuitry of FIG. 6. Accordingly, those elements are given the same numbers as in the preceding case, but which are primed.

Returning to FIG. 7, an additional specific embodiment is illustrated in dashed lines in the figure. In this additional embodiment the seawater 3 also serves as the optical data link in lieu of the tethering optical cable. Thus, a laser 20, symbolically represented as a light source, has an output external of buoy 11'. In operation the laser provides the coded pulses of light which are picked up by the submarine periscope 71. Being coded International Morse Signals, such long and short duration flashes of light can be readily detected and decoded into English by a trained individual, such as a radio operator. Alternatively, known electronic circuits for automatically decoding International Morse Code and printing the message in English may be included in the submarine's equipment as an alternative to the trained individual.

As a further alternative to the combination a direct wire connection may be made from the submarine buoy to the submarine with an electrical cable of the type, suitable for immersion in seawater. At one end the cable terminates within the submarine; at the other within the submarine buoy. The cable also serves to tether the buoy to the submarine.

As represented in the block diagram of FIG. 9 only minor adaption is required to interface GPS receiver 67 to the cable in this alternative embodiment. As in the preceding case interface 2'' has its inputs connected to the GPS receiver outputs for receiving the latitude and longitude information contained in electronic form in the receiver's registers and couples this information via output 14'' to buffer 22. The output of the buffer is connected by appropriate multi-conductor sheathed waterproof electrical cable 26, which extends therefrom, through the seawater into the submarine.

Since data rates are not high, the output from the GPS receiver circuits are typically serial, in which case cable 26 need contain only two insulated leads for this purpose. The information is sent and received in sequence.

If instead parallel information or code in parallel form is supplied by the GPS receiver that same parallel form information is supplied as levels of electrical voltage via cable 26 to the receiving equipment in the submarine. Since that information presented within the submarine is in identical form to that found in a GPS receiver, the identical display circuits that are typically found within the housing of a self-contained GPS receiver may be employed in the submarine.

Suitably an alpha numeric type digital display either liquid crystal or gaseous discharge type, not illustrated, may be employed on board the submarine to display to the ship's operator the appropriate numeric readings of latitude and longitude. The operator may then update the submarines navigation equipment based on that information.

Reference is made to FIG. 10 in which an additional embodiment of the invention incorporating an "emergency" buoy is pictorially presented. As depicted a disabled submarine 42 is submerged in water 44 beneath the layer of ice 46 and the buoy 48 is in deployed position after having cut through the ice layer with its antenna 52 extended above the ice layer.

The buoy transmits a 406 Megahertz RF signal which is one of the frequencies used by the Emergency Position Information Radio Beacon satellites, represented symbolically at 54. Emergency Position Information Radio Beacon satellites, also referred to by the acronym "EPIRB" satellites, which orbit the earth are designed to receive transmissions from buoys launched by vessels in distress. Those satellites "listen" for such "SOS" beacons. When received the satellites store the information sent by such bouys and, when the satellite in the course of its orbital travel comes into view of an associated EPIRB ground station, the satellite retransmitts that information to the ground station. As is also known the EPIRB satellites are capable of generally detecting the global source position from which the SOS signal originates and also transmits that information to the distant ground station. Personnel at the ground station are then alterted to the distressed vessel and its whereabouts and should effect rescue.

A RF homing beacon is also transmitted from the buoy over antenna 52, typically 121 Megahertz RF signal and a strobe. This signal is intended to be picked up by incoming rescuers, such as represented by helicopter 56, so that they may home in on the buoy.

The RF signals are supplied by two RF generator-transmitters confined internally within the buoy housing. Although not illustrated, the system also incorporates a generator of acoustic pulses to act as an underwater homing device, which is actuated at this time. Underwater acoustic homing pulses can be emitted to permit underwater submarines to make the rescue.

The partial sectional view of the bottom location of the buoy presented in FIG. 11 generally illustrates the physical placement for the two transmitters 58 and 60, in the buoy which are presented as example. Those same transmitters are illustrated in block diagram in FIG. 12 with their RF outputs connected in common to transmitting antenna 52. Other elements common to the preceding embodiments are identified by the same number as before and need not be further described.

In this emergency buoy the transmitters may be activated in any conventional manner. As example, an electrical switch circuit may close the battery power supply to the two transmitters in response to detection of salt water or any water whatsoever as would occur when the buoy is released from the submarine into the water. Alternatively, the power is supplied to the transmitters when the operator manually closes power supply switch 62 in preparation to releasing the buoy into the water.

FIG. 13 provides a block diagram of the ship board sonar equipment that converts received ultrasonic sound to audible audio sound, which is well known to those skilled in the present art. Essentially a hydrophone transducer 62, suitable for immersion in water, picks up ultrasonic energy and converts it into corresponding electrical signals at the same frequency which is inputted into a superhetrodyne type receiver 64. The receiver contains a local oscillator that provides signals of a higher or lower frequency, and mixes that local oscillator signal with or "beats" it against the incoming signal to generate a difference signal whose frequency is in the audio frequency range. Simply by knowing the range of ultrasonic frequency to be received the local oscillator may be adjusted so that any frequency difference falls in the audio range. The electrical audio frequency signal thus produced is outputted by convertor 64 and supplied to a loudspeaker or earphone 66, which converts same to audible sound.

Aspects of the described embodiments may be employed to enable the submarine to perform above-the-ice surveillance. In FIG. 14 a system is illustrated in which submarine 71, submerged in water 73 under a layer of ice 75 is tethered to a submarine buoy 77 by a fiber optic cable 79. A broad band receiving antenna 81 extends from the buoy so as to intercept above the ice broadcasts, such as that emitted by Arctic radio transmitting station 83. Additionally antenna 81 may carry optical and/or infra red type sensors 85. While the antenna receives RF signals, the sensors are capable of receiving images of the area. Suitable electrical leads connect the sensor to appropriate electronic processing equipment located in the buoy. The down lead from the antenna also extends into the buoy.

As in the preceding embodiments the antennas and sensors are physically packed within the buoy in any convenient manner. The transmitting equipment, however, necessarily is more complicated, but in ways known to those who design such equipment the details of which are not here relevant. Essentially the fiber optic cable serves as a communication media for modulated light information, much as in the same way that telecommunications signals are sent via the fiber optic transmission medium. The transmitter in the buoy converts the RF received into a modulated light output. So too the image information from the sensors is converted to modulated light output that is applied to the optic cable, suitably multiplexed with that modulated light output from the RF converting equipment. Corresponding detection and demodulating apparatus of known structure is located on board the submarine to receive the modulated light information from the on board end of the optic cable and provide suitable audio and visual display of the received information. Thus not only does the optic cable serve to couple the bursts of light as in the prior embodiment, but is more versatile and can serve to couple complex modulated light signals as well.

It is believed that the foregoing description of the preferred embodiments of the invention is sufficient in detail to enable one skilled in the art to make and use the invention. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. A ice penetrating Arctic buoy adapted to be carried by and released from a submarine, comprising in a housing:
   thermochemical ice penetrating means located at the top end of said housing for penetrating ice to form a passage through a layer of ice;
   floatation means coupled to said housing for providing a buoyant upward force on said buoy responsive to said buoy being immersed in water upon release from said submarine to press said ice penetrating means against any overlying layer of ice;
   antenna means, said antenna means being adapted to be released from said housing structure and moved through a passage in said ice formed by said ice penetrating means to an exposed position above said ice;
   global positioning system receiver means for receiving satellite transmission broadcasts from global positioning system satellites to provide at an output latitude and longitude information, said antenna means being coupled to said global positioning system receiver means for coupling satellite transmission broadcasts thereto, wherein said global positioning system receiver means detects and decodes and temporarily stores in memory said latitude and longitude information;
   transmitting means coupled to said global positioning system receiver means for transmitting said latitude and longitude information stored by said global positioning system receiver means into an underwater data link for transmission to a submerged submarine, said submarine including receiving means coupled to said underwater data link for receiving latitude and longitude information from said underwater data link.

2. The invention as defined in claim 1 wherein said transmitting means comprises:
   acoustic transducer means for converting input electrical signals to ultrasonic sound with said ultrasonic sound being coupled to said under water data link;
   converter circuit means coupled to said Global positioning system receiver for receiving coded information representative of latitude and longitude and providing electrical signals representative thereof at an output;
   means coupling said converter output to said acoustic transducer means wherein said acoustic transducer means couples sonic impulses representative of said latitude and longitude information to water.

3. The invention as defined in claim 1 wherein said transmitting means further comprises:
   high intensity light transmitter means for converting input electrical signals to optical signals with said optical signals being coupled to said underwater data link;
   said high intensity light transmitter means coupled to said Global positioning system receiver for receiving coded information representative of latitude and longitude and producing bursts of light representing latitude and longitude information, wherein said light emitting means couples light impulses representative of latitude and longitude information to said underwater data link; and
   wherein said receiver means in said submarine further comprises:
   photodetector means for converting light detected to electrical signals, said submarine includes periscope means for permitting optical review of the environment about said submarine, said photodetector means being coupled to said periscope to receive light in the environment viewed by said periscope, including light bursts produced by said light transmitter means.

4. The invention as defined in claim 1 wherein said transmission means further comprises:
   Optical cable means connected to said submarine and said buoy for tethering said buoy and providing a light conducting transmission path therebetween;
   Light transmitter means in said buoy having an input coupled to said Global positioning system receiver and an output connected to said optical cable for receiving coded information representative of latitude and longitude from said Global positioning system receiver and producing bursts of light correlated thereto, whereby said light emitting means couples light impulses representative of latitude and longitude information to said optical cable; and
   wherein said receiver means in said submarine further comprises:
   photodetector means having an input connected to said optical cable for converting light detected on said optical cables to corresponding electrical signals, whereby electrical signals are produced that are representative of said latitude and longitude information produced by said light transmitter means.

5. The method of correcting navigation position information of the latitude and longitude in the electronic navigation system carried by a submarine with said submarine being submerged under an ice pack, said navigation system including input means for permitting entry of new latitude and longitude information to replace such latitude and longitude information existing in said navigation system, comprising the steps of:

releasing a buoy from the submarine into the seawater beneath the ice with said buoy containing a Global Positioning Satellite receiver means, antenna means, transmitter means and thermochemical ice penetrator means, whereby following an interval of time after release of said buoy said penetrator means breaks through the ice and said antenna means is extended to receive RF signals from said Global positioning system satellites and couple that information to said Global positioning system receiver means;

transmitting the received Global positioning system information from said Global positioning system receiver means to said submarine via said transmitter means;

receiving Global positioning system information in said submarine; and entering the Global positioning system information received in said submarine into said submarine electronic navigation system.

6. A method of inviting rescue from aboard a submarine that is disabled and submerged in seawater beneath a cap of ice, comprising the steps of:

releasing a buoy from the submarine into the seawater beneath the ice with said buoy containing Emergency Position Information Radio Beacon transmitter means, antenna means, transmitter means and thermochemical ice penetrator means, whereby following an interval of time said penetrator means breaks through the ice and said antenna means is extended to enable broadcast of RF signals from said transmitter means to orbiting Emergency Position Information Radio Beacon satellites and a homing beacon; and broadcasting a beacon homing signal at a first RF frequency and broadcasting a Emergency Position Information Radio Beacon signal at a second RF frequency.

7. A ice penetrating Arctic rescue buoy for a submarine, comprising:
A housing;
Thermochemical ice penetrating means located at the top end of said housing for melting ice to form a passage through a layer of ice;
Floatation means coupled to said housing for providing a buoyant upward force on said buoy responsive to said buoy being immersed in water upon release from said submarine to press said ice penetrating means against any overlying layer of ice;
Antenna means, said antenna means being adapted to be released from said housing structure and moved through a passage in said ice formed by said ice penetrating means to an exposed position above said ice;
Emergency Position Information Radio Beacon transmitter means coupled to said antenna means for transmitting RF signals of a predetermined frequency to Emergency Position Information Radio Beacon satellites to send information of a submarine in peril: and
Homing beacon transmitter means coupled to said antenna means for sending a homing beacon above the ice layer whereby the buoy alerts others of the need for rescue and provides guidance to potential rescuers to the location of the buoy.

8. A ice penetrating Arctic surveillance buoy adapted to be carried by and released from a submarine, comprising:
a housing;
thermochemical ice penetrating means located at the top end of said housing for penetrating ice to form a passage through a layer of ice;
floatation means coupled to said housing for providing a buoyant upward force on said buoy responsive to said buoy being immersed in water upon release from said submarine to press said ice penetrating means against any overlying layer of ice;
sensor means, said sensor means being adapted to be released from said housing structure and moved through a passage in said ice formed by said ice penetrating means to an exposed position above said ice to detect ambient conditions above the ice;
receiver means for receiving information from said sensor means to provide at an output information sensed of above the ice conditions, wherein said receiver means detects and decodes and temporarily stores in memory said sensed information; and
transmitting means coupled to said receiver means for transmitting said sensed information stored by said receiver means into an underwater data link for transmission to a submerged submarine.

9. The invention as defined in claim 8 wherein said underwater data link comprises sea water.

* * * * *